(12) United States Patent
Yotsuzuka

(10) Patent No.: US 8,857,384 B2
(45) Date of Patent: Oct. 14, 2014

(54) CONSTRUCTION MACHINE

(75) Inventor: Hironori Yotsuzuka, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/576,631

(22) PCT Filed: Jan. 18, 2012

(86) PCT No.: PCT/JP2012/050980
§ 371 (c)(1),
(2), (4) Date: Aug. 1, 2012

(87) PCT Pub. No.: WO2012/105320
PCT Pub. Date: Aug. 9, 2012

(65) Prior Publication Data
US 2013/0068177 A1    Mar. 21, 2013

(30) Foreign Application Priority Data

Feb. 1, 2011 (JP) .................... 2011-019845

(51) Int. Cl.
| | |
|---|---|
| *F01P 7/00* | (2006.01) |
| *F01P 7/02* | (2006.01) |
| *F01P 5/06* | (2006.01) |
| *F01P 11/10* | (2006.01) |
| *F01P 1/06* | (2006.01) |
| *E02F 9/08* | (2006.01) |
| *B64D 33/08* | (2006.01) |

(52) U.S. Cl.
CPC ......... *F01P 7/02* (2013.01); *B64D 2700/62973* (2013.01); *F01N 2260/022* (2013.01); *F01N 2340/04* (2013.01); *F01N 2590/08* (2013.01); *B64D 33/08* (2013.01); *F01P 7/023* (2013.01); *F01P 5/06* (2013.01); *F01P 11/10* (2013.01); *F01P 1/06* (2013.01); *E02F 9/0866* (2013.01)

USPC ........................................ 123/41.58

(58) Field of Classification Search
CPC ............... F01P 7/023; F01P 7/02; F01P 5/06; B64D 2700/62973; B64D 33/08
USPC ........................................ 123/41.58
See application file for complete search history.

(56) References Cited

U.S. PATENT DOCUMENTS

| | | | |
|---|---|---|---|
| 2006/0144350 A1* | 7/2006 | Nakashima et al. | 123/41.01 |
| 2010/0218488 A1* | 9/2010 | Yokota | 60/297 |
| 2011/0088637 A1* | 4/2011 | Hirasawa et al. | 123/41.31 |
| 2012/0079810 A1* | 4/2012 | Abe et al. | 60/272 |

FOREIGN PATENT DOCUMENTS

| | | |
|---|---|---|
| JP | 2002-192960 A | 7/2002 |
| JP | 2007-55534 A | 3/2007 |

(Continued)

*Primary Examiner* — Lindsay Low
*Assistant Examiner* — Charles Brauch
(74) *Attorney, Agent, or Firm* — Global IP Counselors, LLP

(57) ABSTRACT

A construction machine includes a main body portion that has an engine compartment formed therein, a cooling unit arranged in the engine compartment, an inlet formed as opening in a side surface of the main body portion so that the cooling air is drawn into the engine compartment by the cooling fan through the inlet, an exhaust gas after-treatment device arranged on an upper side relative to the engine on the downstream side relative to the cooling fan on a flow path of the cooling air, an engine hood that covers the exhaust gas after-treatment device, and an upper outlet arranged immediately above the exhaust gas after-treatment device and formed in at least one of a top surface of the engine hood and a side surface of the engine hood in a front-and-rear direction of the main body.

7 Claims, 7 Drawing Sheets

(56) References Cited

FOREIGN PATENT DOCUMENTS

| | | | |
|---|---|---|---|
| JP | 2010-7525 A | 1/2010 |
| JP | 2010-58592 A | 3/2010 |
| JP | 2010-215122 A | 9/2010 |
| JP | 2012-67556 A | 4/2012 |

* cited by examiner

CONSTRUCTION MACHINE

CROSS-REFERENCE TO RELATED APPLICATIONS

This application claims priority to Japanese Patent Application No. 2011-019845 filed on Feb. 1, 2011, the disclosure of which is hereby incorporated herein by reference in its entirety.

TECHNICAL FIELD

The present invention relates to a construction machine which includes an exhaust gas after-treatment device in an engine compartment.

BACKGROUND ART

Construction machines such as hydraulic excavator have been known which include a cooling device for cooling an engine in an engine compartment.

For example, Japanese Patent Laid-Open Publication TOKUKAI No. 2007-55534 discloses a construction machine (hydraulic excavator) including an air inlet and air outlets which are arranged at specially designed positions in a main body portion in order to reduce noise from the main body portion and to allow cooling air to properly flow in the engine compartment.

In recent years, a construction machine is also known including an exhaust gas after-treatment device such as diesel particulate filter and selective catalytic reduction for removing particulate substance contained in engine exhaust gas in order to take measures against engine exhaust emission standards (see Japanese Patent Laid-Open Publication TOKUKAI No. 2010-7525). In Japanese Patent Laid-Open Publication TOKUKAI No. 2010-7525, an exhaust as after-treatment device is mounted to a separated member from the engine for the purpose of preventing that engine vibration is directly conducted to the after-treatment device.

SUMMARY

However, the aforementioned known construction machines have the following problems.

That is, in the construction machine disclosed in Japanese Patent Laid-Open Publication TOKUKAI No. 2007-55534, the engine compartment does not accommodate a relatively large device such as exhaust gas after-treatment device. For this reason, in the case where the exhaust gas after-treatment device is installed in the construction machine disclosed in Japanese Patent Laid-Open Publication TOKUKAI No. 2007-55534, it is difficult to surely provide a smooth air flow path in the engine compartment. If the cooling air flow path is disturbed in the engine compartment, the cooling air cannot be smoothly discharged through the outlets. As a result, the cooling efficiency of the cooling device may be reduced.

On the other hand, in the construction machine disclosed in Japanese Patent Laid-Open Publication TOKUKAI No. 2010-7525, as for installation of exhaust gas after-treatment device such as diesel particulate filter, the cooling air flow path in the engine compartment is not taken into consideration. For this reason, since the exhaust gas after-treatment device is installed, the cooling air flow path is disturbed in the engine compartment. Accordingly, the cooling air cannot be smoothly discharged through such an outlet. Similarly, as a result, the cooling efficiency of the cooling device may be reduced.

It is an object to provide a construction machine which includes an exhaust gas after-treatment device, and can surely provide a cooling air flow path in an engine compartment whereby improving the cooling efficiency.

A construction machine according to a first aspect of the invention includes a main body portion, an engine, a cooling unit, an inlet, an upper outlet, an engine hood, and an exhaust gas after-treatment device. An engine compartment is formed in the main body portion. The engine is arranged in the engine compartment. The cooling unit is arranged in the engine compartment, and includes a cooling fan, and a cooling core. The cooling fan blows cooling air for cooling the engine. The cooling core exchanges heat with the cooling air. The inlet is formed as opening in a side surface of the main body portion. The cooling air is drawn into the engine compartment by the cooling fan through the inlet. The exhaust gas after-treatment device serves as an after-treatment device for reducing particulate matter contained in the exhaust gas from the engine. The exhaust gas after-treatment device is arranged on upper side relative to the engine. The exhaust gas after-treatment device is arranged on the downstream side relative to the cooling fan on the flow path of the cooling air. The engine hood covers the exhaust gas after-treatment device. The upper outlet is arranged immediately above the exhaust gas after-treatment device, and is formed in at least one of the top surface of the engine hood and a side surface of the engine hood in the main body front-and-rear direction.

According to this construction machine, in the engine compartment, which is formed in the main body portion of the construction machines such as the hydraulic excavator, the exhaust gas after-treatment device is arranged on the flow path of the cooling air, which is blown by the cooling fan, so that the cooling air is intentionally blown onto the exhaust gas after-treatment device after passing through a part beside the engine.

That is, according to this construction machine of the present invention, the cooling unit, the engine, and the exhaust gas after-treatment device are arranged in this order from the inlet, which is formed in the side surface of the main body portion, in the engine compartment along the flow path of the cooling air, which flows in the engine compartment, so that the cooling air is blown onto the exhaust gas after-treatment device.

According to this construction machine, since the side surface of the exhaust gas after-treatment device serves as a wind-guiding plate for guiding the cooling air, the cooling air can smoothly flow in the engine compartment, and can be smoothly externally discharged through the upper outlet, which is arranged in the engine hood immediately above the exhaust gas after-treatment device. As a result, the cooling air can flow on the flow path without being disturbed after flowing from the inlet into the engine compartment so that the cooling air can be smoothly discharged through the upper outlet. Therefore, it is possible to improve the cooling efficiency as compared with conventional construction machines.

In a construction machine according to a second aspect of the present invention, in the construction machine according to the first aspect of the present invention, further includes a lower outlet that is formed in the bottom surface of the main body portion.

In this construction machine which includes the lower outlet in addition to the aforementioned upper outlet, the exhaust gas after-treatment device serves as a wind-guiding plate for guiding the cooling air in the engine compartment, and is arranged at the position which allows the exhaust gas after-treatment device to guide the cooling air to the upper and lower outlets.

According to this construction machine, after coming through the inlet into the engine compartment, passing through the cooling unit, and then flowing along the engine upper surface, the cooling air can be smoothly discharged through the upper and lower outlets, which are formed in the upper and bottom surfaces of the main body portion.

In a construction machine according to a third aspect of the present invention, in the construction machine according to the first or second aspect of the present invention, the vertical center position of the main part of the exhaust as after-treatment device is positioned to substantially agree with the vertical position of the upper surface of the engine.

In this construction machine, the vertical position of the exhaust gas after-treatment device is specified with respect to the vertical position of the upper surface of the engine along which the cooling air flows.

According to this construction machine, since the upper half of the exhaust gas after-treatment device protrudes from the engine upper surface, after the cooling air comes through the inlet into the engine compartment, passes through the cooling unit, and then flows along the engine upper surface, the cooling air collides with the upper part of the exhaust gas after-treatment device, and can be guided into a desired direction.

In a construction machine according to a fourth aspect of the present invention, in the construction machine according to any of the first to third aspects of the present invention, the exhaust gas after-treatment device has substantially the same length as the length of the engine compartment in the direction perpendicular to the direction of the flow path of the cooling air.

In this construction machine, the exhaust gas after-treatment device has substantially the length which substantially fully extends in the engine compartment in the direction perpendicular to the flow path of the cooling air.

According to this construction machine, after flowing along the engine upper surface, the cooling air can be surely guided into a desired direction.

In a construction machine according to a fifth aspect of the present invention, in the construction machine according to the second aspect of the present invention, the positions of the upper outlet and the lower outlet substantially agree with each other in the main body width direction as viewed from the main body rear side.

In this construction machine, the upper and lower outlets are positioned to substantially agree with each other in the main body width direction as viewed from the main body rear side.

According to this construction machine, after being blown onto the upper part of the exhaust gas after-treatment device and guided into a desired direction, the cooling air can be smoothly guided to the outside through the upper and lower outlets, which are arranged above and under the exhaust gas after-treatment device.

In a construction machine according to a sixth aspect of the present invention, in the construction machine according to any of the first to fifth aspects of the present invention, upper outlets are arranged as the upper outlet right above the exhaust gas after-treatment device, and are formed in both the top surface of the engine hood and a side surface of the engine hood in the main body front-and-rear direction.

In this construction machine, the upper outlets are arranged in a side surface of the engine hood in addition to in the upper surface of the main body portion.

According to this construction machine, since one of the upper outlets is opened in the horizontal direction, it is possible to effectively suppress that wind and rain, fallen leaves, and soil come into the engine compartment through the upper outlet.

In a construction machine according to a seventh aspect of the present invention, in the construction machine according to any of the first to sixth aspects of the present invention, the exhaust gas after-treatment device has a substantially circular shape, substantially oval shape, or rectangular shape as viewed in section.

In this construction machine, the exhaust as after-treatment device is provided which has a substantially circular or oval shape in section.

According to this construction machine, after colliding with the side surface of the exhaust gas after-treatment device, the cooling air can be smoothly guided into a desired direction.

According to a construction machine of the above aspects of the present invention, it is possible to surely provide a cooling air flow path in an engine compartment whereby improving the cooling efficiency, in a construction machine which includes an exhaust gas after-treatment device.

BRIEF DESCRIPTION OF DRAWINGS

FIG. 3(*b*) is a cross-sectional view of the hydraulic excavator taken along the line A-A as viewed from the side shown by the arrows in FIG. 3(*a*).

DESCRIPTION OF EMBODIMENTS

With reference to FIGS. 1 to 6, the following description will describe a hydraulic excavator (construction machine) 1 according to an embodiment of the present invention.

Figure 1:
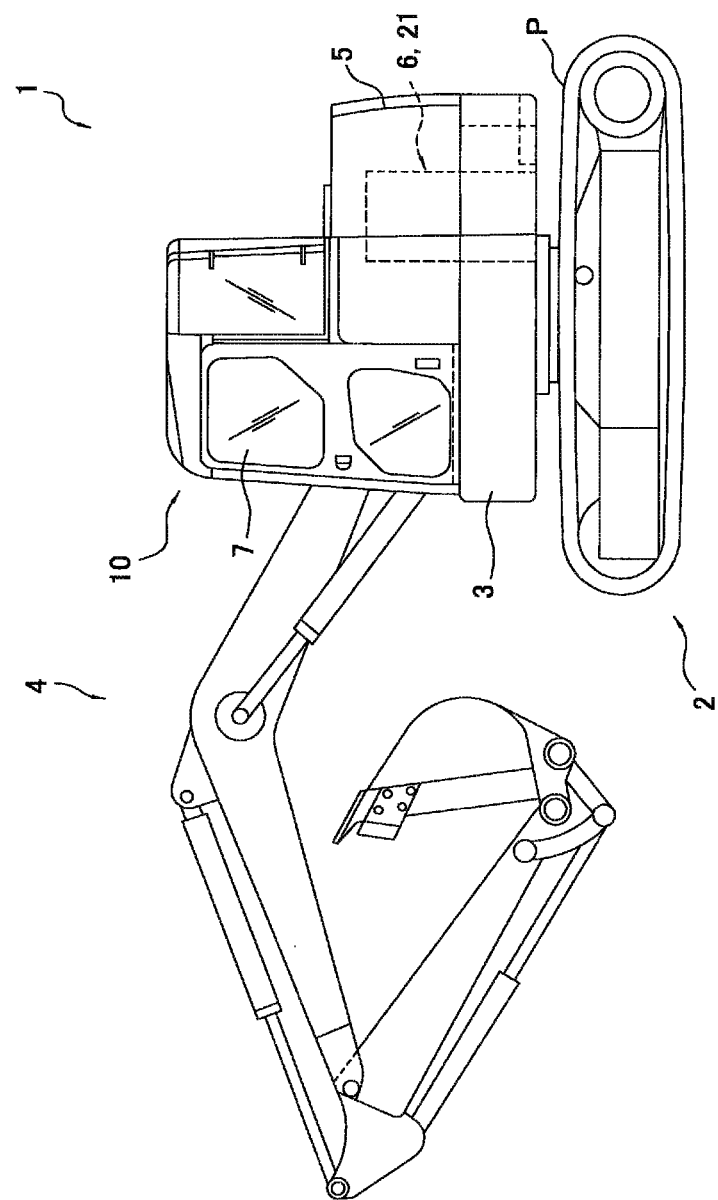
FIG. 1 is a side view of the outline of a hydraulic excavator according to an embodiment of the present invention.

As used herein to describe the present invention, terms the "main body front-and-rear direction" and "main body left-and-right direction" should be interpreted as the "front-and-rear direction" and "left-and-right direction" relative to an operator when sitting on a seat in a cab 10, and facing frontward (see FIG. 1, for example).

Overall Construction of Hydraulic Excavator 1

Figure 2:
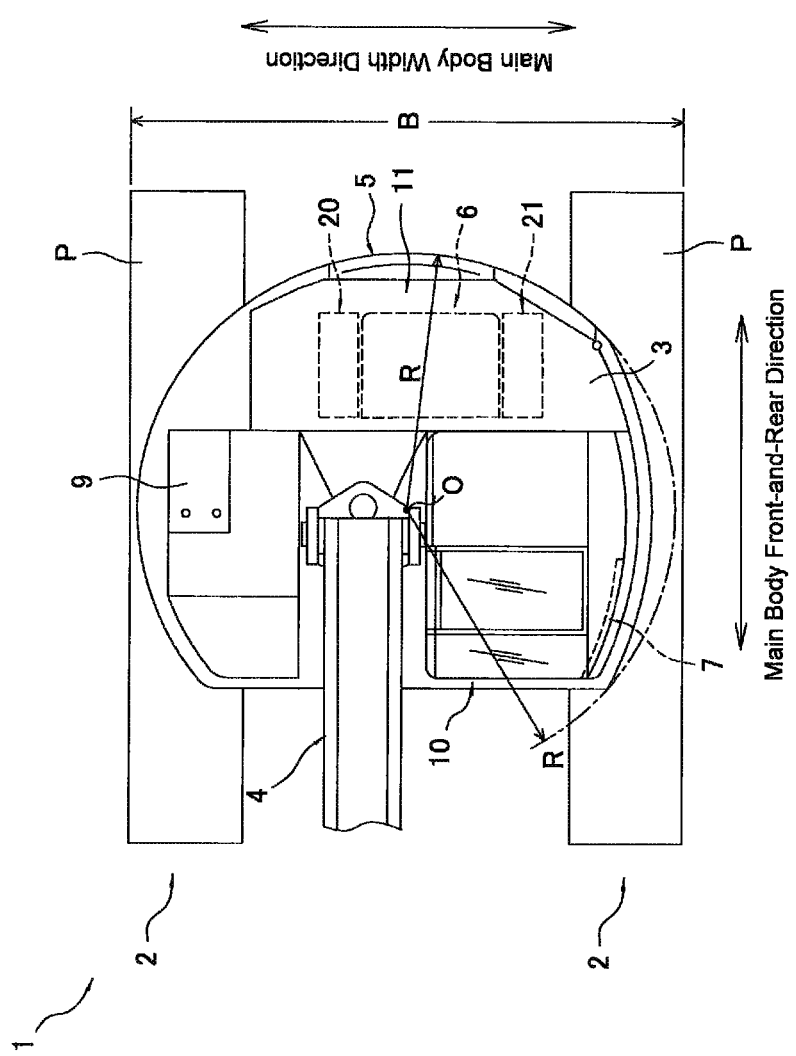
FIG. 2 is a plan view showing the hydraulic excavator shown in FIG. 1.
Figure 3:
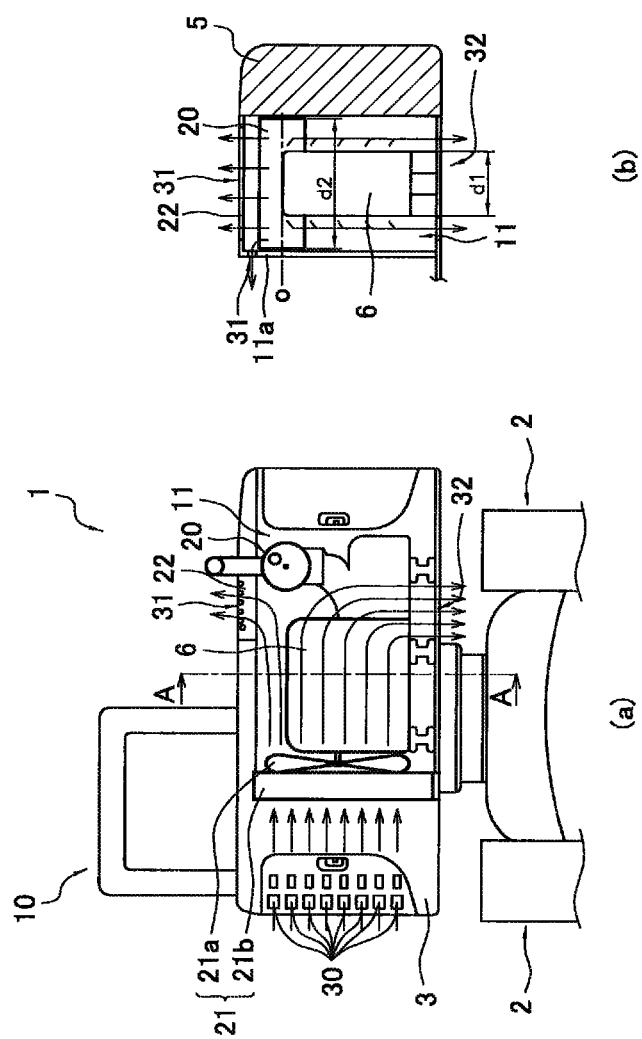
FIG. 3(*a*) is a partially cross-sectional view showing the hydraulic excavator shown in FIG. 1 as viewed from the rear side.
Figure 4:
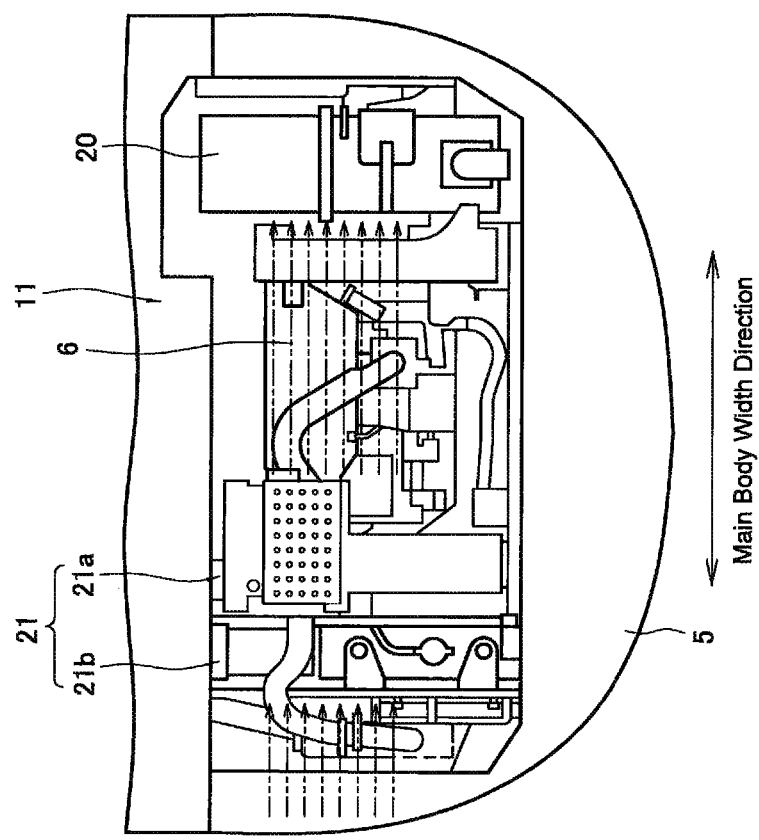
FIG. 4 is a plan view showing the structure in an engine compartment of the hydraulic excavator shown in FIG. 1.

The hydraulic excavator 1 according to this embodiment includes a tower traveling unit 2, a revolving unit (main body portion) 3, a work implement 4, a counterweight 5, an engine 6, an equipment compartment 9, the cab 10, an exhaust gas after-treatment device 20, and a cooling unit 21, as shown in FIGS. 1 and 2. The hydraulic excavator 1 is a so-called minimal tail-swing radius (defined by Japanese Industrial Standards (JIS A 8340-4)) hydraulic excavator, which has a tail swing radius ratio is not more than 120% of the width B of the lower traveling unit 2 for keeping main body rear side safety at swing operation, and a front minimum radius ratio is over than 120%.

The lower traveling unit 2 drives crawler belts P which are wounded on the left and right sides of the lower traveling unit 2 relative to the advance direction so that the hydraulic excavator 1 travels frontward and rearward. The revolving unit 3 is revolvably mounted on the upper part of the lower traveling unit 2.

The revolving unit 3 can revolve (swing) about the revolution center O in either directions on the lower tractor unit 2. The work implement 4, the counterweight 5, the engine 6, the cab 10 and the cooling unit 21 are mounted on the upper side of the revolving unit 3. Also, an inlet 30 is formed in a side surface of the revolving unit 3. Upper outlets 31 are formed in an engine hood 22, which can be opened/closed, and is arranged in the upper surface of the revolving unit 3. A lower outlet 32 is formed in the bottom surface of the revolving unit 3 (see FIG. 3(a)). Thus, a flow path of cooling air (discussed later) is formed.

The work implement 4 includes a boom, an arm which is mounted to the fore end of the boom, and a bucket which is mounted to the fore end of the arm. The work implement 4 actuates the arm, the bucket, and the like upward and downward by means of hydraulic pressure cylinders to excavate earth and stones in the earthmoving fields.

The counterweight 5 is composed of scrap iron, concrete and the like which are fixed in a box composed of steel plates, for example, and is arranged on the rear (tail) part of the revolving unit 3 to keep the balance of the main body in excavation or the like.

The engine 6 is a power source which powers the lower traveling unit 2 and the work implement 4, and is arranged in an engine compartment 11 near the counterweight 5.

The equipment compartment 9 is arranged at the side of the work implement 4, and accommodates a fuel tank, a hydraulic oil tank, operation valves and the like (not shown).

The cab 10 is an operator compartment of the hydraulic excavator 1 where the operator steps into/off, and is arranged in the front left side part of the revolving unit 3 on the side of the working implement 4 to provide a clear sight line to the fore end of the work implement 4 for the operator.

The exhaust gas after-treatment device 20 serves as an after-treatment device for reducing particulate matter contained in the exhaust gas from the engine 6, and is arranged in proximity to the engine 6 in the engine compartment 11. In addition, according to the arrangement discussed later, the exhaust gas after-treatment device 20 serves as a wind-guiding plate in the engine compartment 11.

The cooling unit 21 is provided for cooling the engine 6. The engine 6 is interposed between the cooling unit 21 and the aforementioned exhaust gas after-treatment device 20, and arranged in proximity to the engine 6 in the engine compartment 11. The cooling unit 21 includes a cooling fan 21a, and a cooling core 21b (see FIG. 3(a)). The cooling fan 21a is rotated by the engine 6. The cooling core 21b exchanges heat to air from cooling water which flows through the engine 6 whereby reducing the temperature of the cooling water of the engine 6. The flow path of the cooling air will be described which is formed by the cooling fan 21a of the cooling unit 21 in the engine compartment 11.

Cooling Air Flow Path Formed in Engine Compartment 11

According to the following arrangement in this embodiment, the flow path for smoothly flowing the cooling air is formed in the engine compartment 11.

Specifically, in the hydraulic excavator 1 according to this embodiment, as shown in FIG. 3(a), the cooling unit 21, the engine 6, and the exhaust gas after-treatment device 20 are arranged in the main body right-and-left direction in this order from the inlet 30, which is formed in a side surface of the revolving unit 3. The engine hood 22 is fastened to partially cover the upper surface of the revolving unit 3, and has the upper outlets 31, which are formed at the positions above the exhaust gas after-treatment device 20 and slightly on the engine 6 side relative to the position right above the exhaust gas after-treatment device 20. In addition, the lower outlet 32 is formed at the position in the bottom surface of the revolving unit 3 under the exhaust gas after-treatment device 20 and slightly on the engine 6 side relative to the position right under the exhaust gas after-treatment device 20.

That is, in the hydraulic excavator 1 according to this embodiment, after the cooling air is drawn from the outside into the engine compartment 11 by the rotation of the cooling fan 21a, the cooling air passes through the inlet 30, the cooling core 21b, the cooling fan 21a, and the engine 6 in this order. After that, the cooling air collides with the side surface of the exhaust gas after-treatment device 20, which has a substantially cylindrical shape, and is guided to the upper outlets 31 and the lower outlet 32.

The vertical center O of the substantially cylindrical exhaust gas after-treatment device 20 is positioned to substantially agree with the upper surface of the engine 6 as shown in FIGS. 3(a) and 3(b). According to this arrangement, after passing along the upper surface of the engine 6, the cooling air collides with the upper half of the side surface of the substantially cylindrical exhaust gas after-treatment device 20, and is guided upward. Since the upper outlets 31 are formed above the exhaust gas after-treatment device 20, the cooling air can be smoothly externally discharged from the machine.

Also, the exhaust gas after-treatment device 20 has a width d2 larger than the width d1 of the engine 6, as shown in FIG. 3(b). Also, the width d2 of the exhaust gas after-treatment device 20 substantially agrees with the width of the engine compartment 11, in other words, with the distance between the end surface of the counterweight 5 and a partitioning plate 11a. Accordingly, when the cooling air produced by the cooling fan 21a flows along the upper and side parts of the engine 6, the cooling air can be smoothly guided to the upper and lower outlets 31 and 32.

More specifically, after the cooling air passes through the cooling unit 21, and flows along the upper surface of the engine 6 in the main body width direction (see the double-dot-dashed line in FIG. 4), most of the cooling air collides with the upper half of the side surface of the exhaust gas after-treatment device 20, and is guided to the upper outlets 31. On the other hand, after the cooling air passes through side surfaces of the engine 6, a part of the cooling air collides with the lower half of the side surface of the exhaust gas after-treatment device 20, and is guided to the lower outlet 32.

Figure 5:
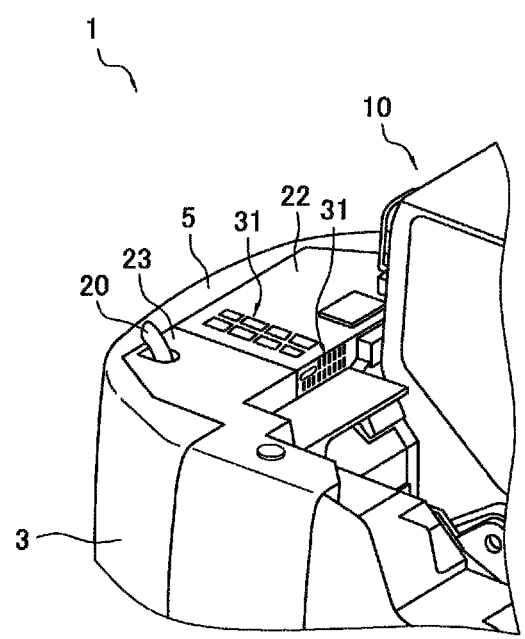
FIG. 5 is a perspective view showing upper outlets formed in a revolving unit upper surface of the hydraulic excavator shown in FIG. 1.

Again, the cooling air is guided by the exhaust gas after-treatment device 20 to the upper outlets 31. These upper outlets 31 are formed in the top and side surfaces of the engine hood 22, which cover the upper part of the engine compartment 11, as shown in FIG. 5. Since the upper outlets 31 have large opening areas in substantially the horizontal direction and substantially the vertical direction, the cooling air can be smoothly discharged. For this reason, it is preferable that the upper outlets 31 are formed in the upper surface and the side surface of the engine hood 22 from the viewpoint of cooling efficiency.

Figure 6:
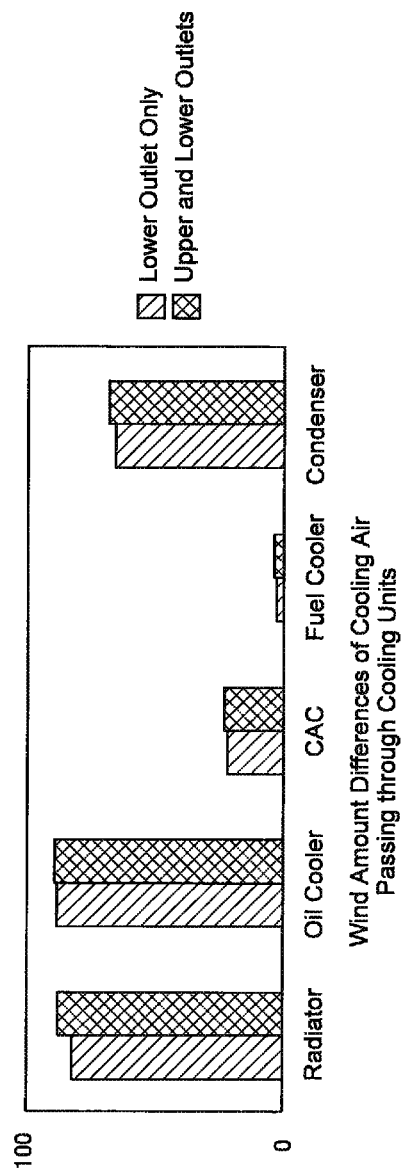
FIG. 6 is a graph showing the comparison of the amounts of cooling air, which passes through a cooling unit, between the conventional case where only a lower outlet is formed, and the case of the present invention where upper and lower outlets are formed.

The following description describes the effect of the outlets (the upper and lower outlets 31 and 32), which are formed in the upper and lower surfaces of the revolving unit 3, on the flow of the cooling air in the engine compartment 11 with reference to FIG. 6.

FIG. 6 is a graph showing the comparison of the amounts of cooling air between the case where upper and lower outlets are formed (this embodiment), and the case where only a lower outlet is formed (conventional case). In this comparison, the cooling air passes through various cooling units (radiator, oil cooler, CAC (Charge Air Cooler), fuel cooler, and condenser) included in the cooling core 21b.

According to this comparison result, it is found that the wind amounts of the cooling air increase in all of the cooling units in the construction according to this embodiment as compared with the conventional construction where only the lower outlet is formed. Specifically, it is found that, in the case where the upper and lower outlets are formed, the average increase of the wind amounts in the cooling units is about 5%.

According to the above result, in the case where the upper and lower outlets 31 and 32 are formed as in this embodiment, the cooling air can smoothly flow in the engine compartment 11 so that the wind amount of the cooling air can increase which passes through the cooling unit 21. Therefore, it is possible to improve the cooling efficiency as compared with the conventional construction.

In addition, since one of the upper outlets 31 is opened toward the center of the main body, it is possible to reduce ambient noise as compared with the case where the upper outlet is opened toward the outside of the main body.

As discussed above, in the hydraulic excavator 1 according to this embodiment, the exhaust gas after-treatment device 20 is arranged on the flow path along which the cooling air flows after being drawn through the inlet 30 into the engine compartment 11 by rotation of the cooling fan 21a. The exhaust gas after-treatment device 20 arranged on the flow path of the cooling air serves as a wind-guiding plate for guiding the cooling air to the upper and lower outlets 31 and 32.

According to this construction, although the exhaust gas after-treatment device 20 is installed in the engine compartment 11 for taking measures against recent exhaust emission standards, the flow of the cooling air is not disturbed in the engine compartment 11 by the exhaust gas after-treatment device 20. Instead, the cooling air can be smoothly guided to the upper and lower outlets 31 and 32. As a result, the wind amount of the cooling air can increase which passes through the cooling unit 21 as compared with the conventional construction. Therefore, it is possible to improve the cooling efficiency of the cooling unit 21.

OTHER EMBODIMENTS

The above description has described an exemplary embodiment according to the present invention. However, the present invention is not limited to the foregoing embodiment. Various changes and modifications can be made without departing from the spirit of the present invention.

(A) In the foregoing embodiment, the upper outlets 31 have been illustratively described to be formed in the top and side surfaces of the engine hood 22 as upper outlets for discharging the cooling air. However, the present invention is not limited to this construction.

Figure 7:
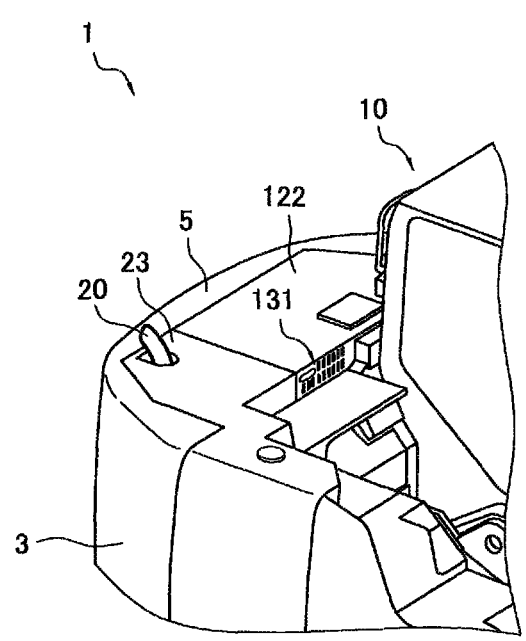
FIG. 7 is a perspective view showing an upper outlet formed in the revolving unit upper surface of the hydraulic excavator according to another embodiment of the present invention.

For example, as shown in FIG. 7, an upper outlet 131 can be formed only in the side surface of an engine hood 122. Also, in order to prevent the possibility of the entry of wind and rain, soil, fallen leaves, and the like into the engine compartment through the upper outlet, it is preferable that only an upper outlet is formed which is opened in substantially the horizontal direction.

Since the upper outlet 131 shown in FIG. 7 is opened toward the center of the main body similarly to the upper outlet 31 of the foregoing embodiment, it is possible to reduce ambient noise as compared with the case where the upper outlet is opened toward the outside of the main body.

(B) In the foregoing embodiment, it has been illustratively described that the cooling air collides with the side surface of the exhaust gas after-treatment device which has a substantially circular shape in section. However, the present invention is not limited to this construction.

For example, the exhaust gas after-treatment device can be used which has a substantially oval shape, or rectangular shape as viewed in section.

Also, in this construction, after colliding with the side surface of the exhaust gas after-treatment device, the cooling air can be guided to the upper and lower outlets.

(C) In the foregoing embodiment, the hydraulic excavator has been illustratively described as a construction machine to which the present invention is adopted. However, the present invention is not limited to this construction.

For example, the present invention can be applied to other construction machines such as wheel loader, crane truck, and bulldozer including the exhaust gas after-treatment device in the engine compartment.

Since a construction machine according to the embodiments includes an exhaust gas after-treatment device, and can provide effect that surely provides a cooling air flow path in an engine compartment whereby improving the cooling efficiency, the structure according to the embodiments can be widely applied to various types of construction machines including an after-treatment device such as exhaust gas after-treatment device.

The invention claimed is:

1. A construction machine comprising:
   a main body portion that has an engine compartment formed therein;
   an engine that is arranged in the engine compartment;
   a cooling unit that is arranged in the engine compartment and includes a cooling fan configured to blow cooling air whereby cooling the engine, and a cooling core configured to exchange heat with the cooling air;
   an inlet that is formed as opening in a side surface of the main body portion so that the cooling air is drawn into the engine compartment by the cooling fan through the inlet;
   an exhaust gas after-treatment device configured to reduce particulate matter contained in the exhaust gas from the engine, and is arranged on an upper side relative to the engine, the exhaust gas after-treatment device being arranged on the downstream side relative to the cooling fan on a flow path of the cooling air such that the cooling air is blown onto the exhaust gas after-treatment device and guided upward;
   an engine hood that covers the exhaust gas after-treatment device; and
   an upper outlet that is arranged immediately above the exhaust gas after-treatment device with the upper outlet partially overlapping the exhaust gas after-treatment device in a top plan view of the construction machine such that the cooling air guided upward by the exhaust gas after-treatment device flows to the upper outlet and is externally discharged through the upper outlet, the upper outlet being formed in at least one of a top surface of the engine hood and a side surface of the engine hood in a front-and-rear direction of the main body, a non-overlapping portion of the upper outlet being disposed on a cooling air upstream side of the exhaust gas after-treatment device in a top plan view.

2. The construction machine according to claim 1, further comprising:
a lower outlet that is formed in a bottom surface of the main body portion.

3. The construction machine according to claim 1, wherein the vertically a vertical center position of a main part of the exhaust gas after-treatment device is positioned to substantially coincide with a vertical position of the upper surface of the engine.

4. The construction machine according to claim 1, wherein the exhaust gas after-treatment device has substantially the same length as a length of the engine compartment in a direction perpendicular to a direction of the flow path of the cooling air.

5. The construction machine according to claim 2, wherein positions of the upper outlet and the lower outlet substantially coincide with each other in a width direction of the main body width direction as viewed from a rear side of the main body rear side.

6. The construction machine according to claim 1, wherein the upper outlet is outlets are arranged as the upper outlet right immediately above the exhaust gas after-treatment device, and are formed in both in each of the top surface and the side surface of the engine hood in the front and rear direction of the main body front-and-rear direction.

7. The construction machine according to claim 1, wherein the exhaust gas after-treatment device has a substantially circular shape, substantially oval shape, or rectangular shape as viewed in section.

\* \* \* \* \*